UNITED STATES PATENT OFFICE.

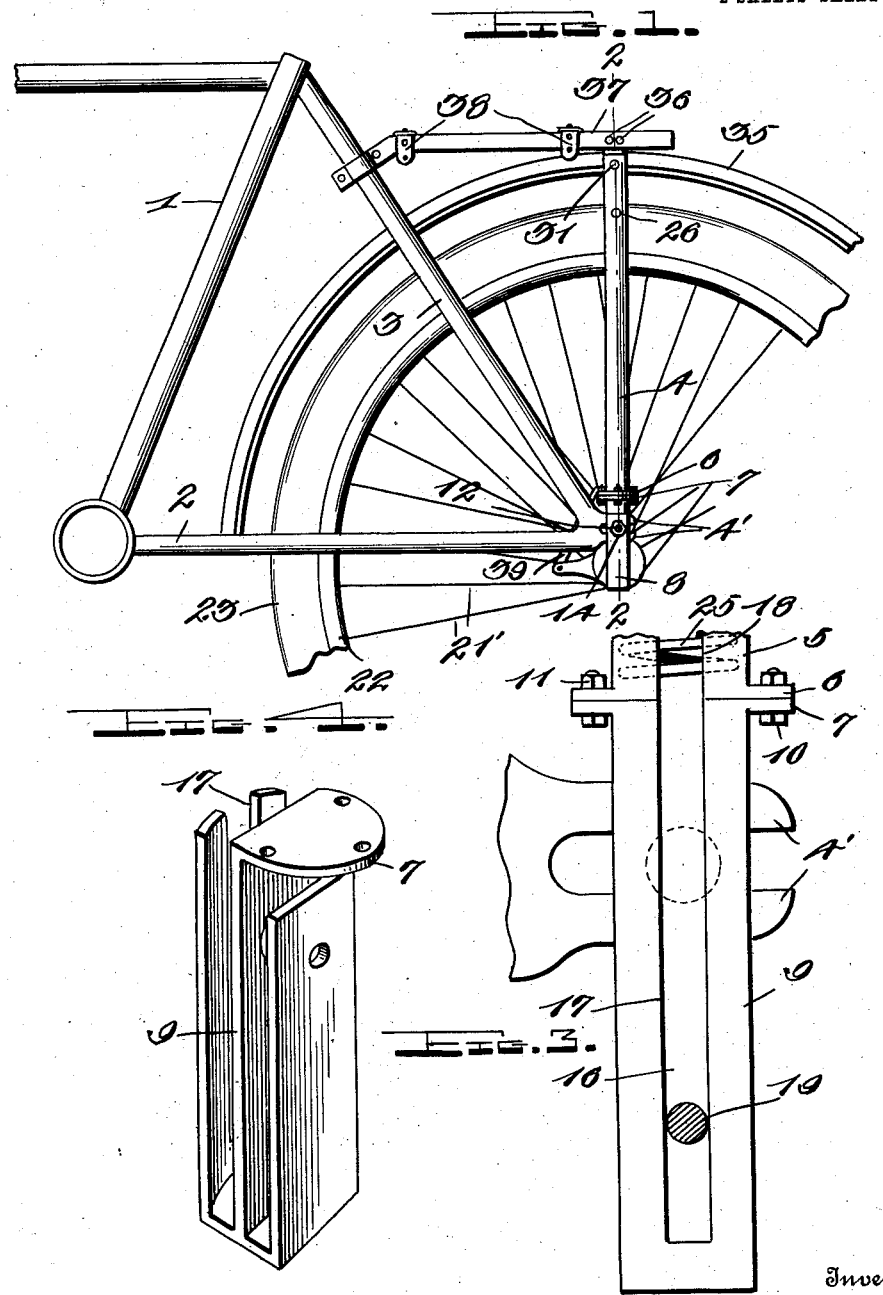

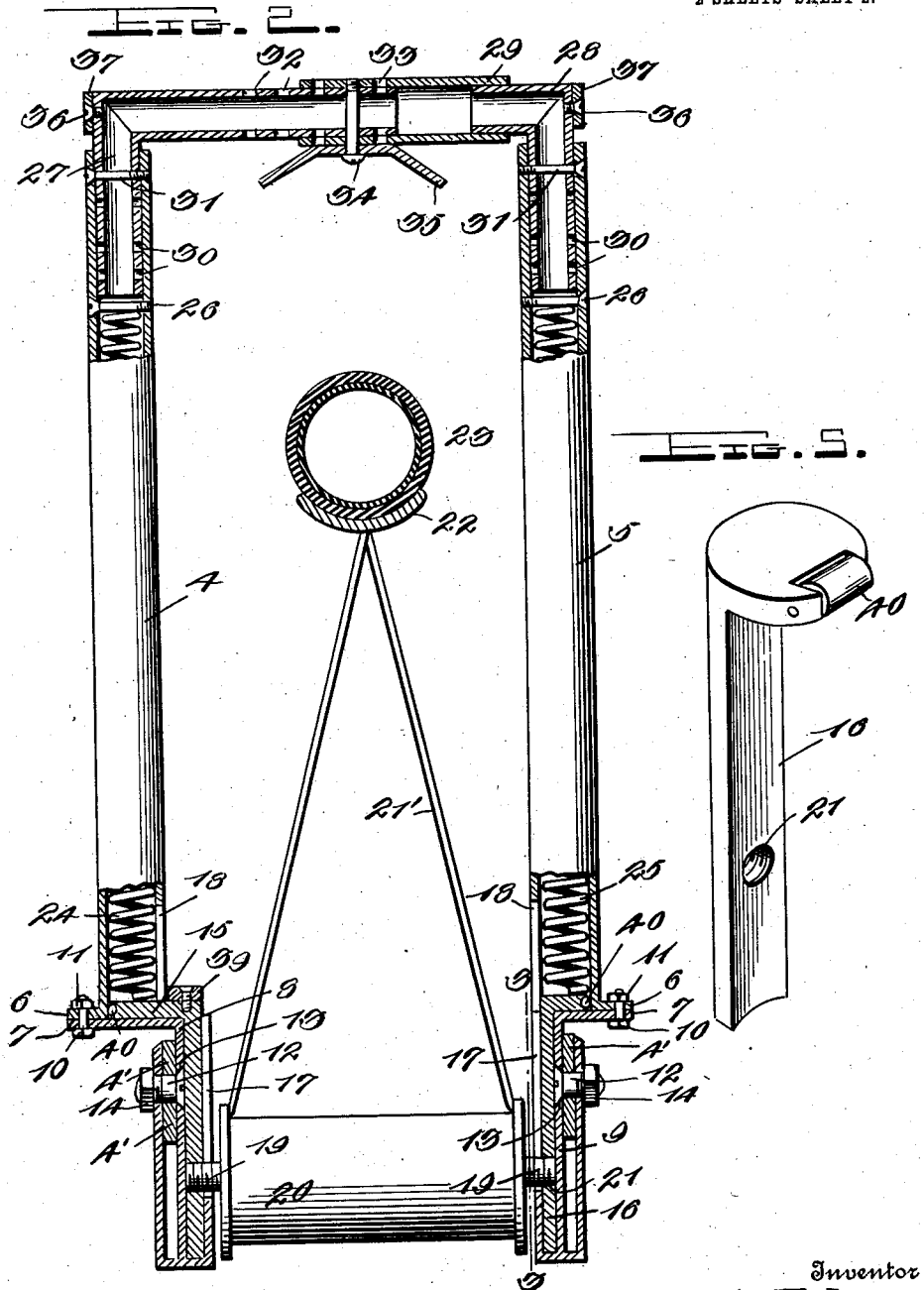

OLOF A. ECKRE, OF KINDRED, NORTH DAKOTA.

SPRING-FORK FOR BICYCLES.

1,027,599.  Specification of Letters Patent.  Patented May 28, 1912.

Application filed November 15, 1911. Serial No. 660,382.

*To all whom it may concern:*

Be it known that I, OLOF A. ECKRE, a citizen of the United States, residing at Kindred, in the county of Cass and State of North Dakota, have invented certain new and useful Improvements in Spring-Forks for Bicycles, of which the following is a specification, reference being had to the accompanying drawings.
My invention relates to new and useful improvements in attachments for bicycles, motorcycles and the like and more particularly to a spring fork therefor, and my object is to provide a device of this character which may be readily applied to any bicycle now in use.

A further object of the invention resides in providing a device which is applied to the frame of the bicycle and which, itself, carries the wheel, as opposed to the present system, wherein the wheel is securely mounted on the rigid frame.

A further object resides in providing a device which is adapted to be applied to that portion of the frame of the bicycle to which the wheel is usually applied, and a further object resides in providing a bracing means therefor, which bracing means is adapted to form a baggage carrier for the machine.

A further object of the invention resides in providing a spring fork which is capable of both lateral and longitudinal adjustment, for obvious purposes.
A further object resides in providing a device of this character which is comparatively simple and extremely durable in construction, one which may be applied to any machine now in use, and one which is in every way efficient and useful in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a fragmentary side elevation of a bicycle or motorcycle showing my improved spring fork applied to use thereon. Fig. 2 is an enlarged vertical section therethrough as seen on line 2—2, Fig. 1. Fig. 3 is a similar view as seen on line 3—3, Fig. 2. Fig. 4 is a detail perspective view of one of the members which secure the tubular sections to the frame of the vehicle, and, Fig. 5 is a similar view of one of the sliding members which is disposed in the member shown in Fig. 4.

In carrying out my invention, I shall refer to the drawing in which similar reference characters designate corresponding parts throughout the several views and in which—

1 indicates the frame of a vehicle such as a bicycle, motorcycle or the like, having the usual horizontal rear fork 2 and the inclined rear fork 3 intersecting the same and provided at the points of intersection with the slotted tongues or extensions 4', which slotted extensions, in usual cases, are adapted to receive the axle of the rear wheel, but with my improved attachment, the same is used for an entirely different purpose. My improved spring fork comprises a pair of tubular members 4 and 5, the lower ends of which are provided with the ears or flanges 6 which are secured to horizontal portions 7 of the substantially inverted L-shaped members 8 and 9, respectively, said ears 6 and portions 7 being held by means of the bolts 10 and nuts 11, and the vertical portions of said members 8 and 9 are designed in double sleeve-like effect, the outer sleeve of each of which is adapted to receive therethrough, the slotted tongues 4' from the frame of the vehicle. Screws 12 extend through the outer sleeve portions of said members 8 and 9 through the slots in said tongues 4', having the heads thereof countersunk in the outer wall of the inner sleeve portions of said members, as shown at 13, and the free ends of said screws have engaged therewith, the nuts 14, whereby the members 8 and 9 with their correspondingly carried tubular portions 4 and 5 will be securely held to the frame of the machine, and slidably arranged in the inner sleeve portions of said members 8 and 9, are the arms or plates 15 and 16, respectively.

It must be here stated that the inner walls of the members 8 and 9 are slotted, as shown at 17, as are the inner walls of the tubular members 4 and 5, as shown at 18, and the tubular portions are so secured to the members 8 and 9 as to dispose the slots 17 and 18 in the members 9 and 5 in vertical alinement, while the similar slots in the members 8 and 4 are disposed in parallel vertical planes. This particular disposition of the slots with respect to one another is accomplished by positioning the member 9 so that the inner wall thereof fits flush with the inner wall of the tubular member 5 and by positioning the socket member 8 so that the inner wall of the latter extends a short distance beyond the inner wall of the tubular member 4, thus providing a shoulder in the latter instance, the purpose of which will be hereinafter and more particularly described. As stated, the plates or arms 15 and 16 are, respectively, disposed in the inner sleeve portions of the members 8 and 9, which plates or arms are of substantially inverted L-shape in vertical section, the horizontal portions of which are adapted to rest normally on the horizontal portions 7 of said members 8 and 9, and extended through the slots 17 of the members 8 and 9, are the stem portions or axle 19 of the hub 20 of a wheel, said stems or axle portion 19 being threaded into engagement with the threaded openings 21 in the plates or arms 15 and 16. This wheel of which the hub 20 forms a part, is of the usual or any desired character, having the spokes 21', the rim 22 and the tire 23 thereon, and from the construction shown and described, it will be seen that as the plates or arms 15 and 16 are moved upwardly in their sleeves, said wheel will be correspondingly raised with respect to the points at which the device is secured to the frame of the machine, and in order to normally retain said plates in their lowermost position, that is, so that the horizontal portions thereof will rest flatly upon the horizontal portions 7 of the members 8 and 9, I provide the strong coil springs 24 and 25 which are, respectively, disposed in the tubular portions 4 and 5, said springs being held under tension therein by means of the screws 26 inserted through said tubular portions.

The tubular members 4 and 5 have telescoped therewithin from the upper ends thereof, the additional tubular members 27 and 28, respectively, which latter members are of substantially inverted L-shape, the horizontal portions thereof being received by a sleeve or union 29. The vertical portions of said members 27 and 28 are provided with a plurality of openings 30 therein, through which are adapted to be inserted the screws 31 which also extend through the members 4 and 5, whereby said members 27 and 28 may be secured to the latter and may be adjusted vertically thereof, when desired, to compensate for various sized wheels which are used in connection with the machine, and the horizontal portions of the member 27 and the sleeve 29 are also provided with a plurality of openings 32 and 33, respectively, through which is adapted to extend a bolt 34, thereby securing the union to the members 27 and 28 and permitting lateral adjustment for various sized hubs which may be used. To the bolt 34 which is used for securing the union 29 to the members 27 and 28, is also secured a mud guard 35, and secured to the members 27 and 28 by means of the screws 36, are the ends of a pair of brace arms 37, the opposite ends of which are clamped to the arms of the inclined fork 3. These arms 37, as stated, are brace arms, retaining the tubular portions of my improved fork in a substantially vertical position, and these arms are provided with a plurality of straps 38, whereby various packages may be secured thereto, and in this connection, it will be seen that said arms, in addition to performing the function of brace arms, also form a baggage carrier for the machine.

As stated previously, the inner wall of the member 8 is not disposed flush with the inner wall of the tubular member 4, but extends beyond the same, thus permitting a portion of the horizontal portion of said member 15 to extend beyond the inner wall of said member 4, and this permits of the arm 39 of the coaster brake being secured thereto. The free ends of the horizontal portions of said members 15 and 16, however, are adapted to contact with the inner peripheries of the tubular members, and in order to prevent unnecessary friction therein as said members 15 and 16 are caused to move therein, the friction rollers 40 are provided on the free ends of said horizontal portions.

In operation, the members 15 and 16 are first properly disposed in the sleeve portions of the members 8 and 9, respectively, and said sleeve portions secured to the slotted tongues 4' of the frame of the machine. The tubular portions 4 and 5 are then secured to the horizontal portions 7 of the members 8 and 9, it being understood that the springs 24 and 25 are already disposed therein under proper tension, and the tubular members 27 and 28 are then properly adjusted in the members 4 and 5. Said members are then properly adjusted laterally through the medium of the bolt 34 in the union 29 and the member 27, whereupon the brace arms 37 are properly secured to the rear fork 3 and the members 27 and 28. This completes the application of the spring fork to the machine, and it will be seen that as weight is placed on the rear fork, possibly through the weight of the rider thereon, a resiliency is adapted to be obtained through the yielding action of the springs 24 and 25, and thus, when the machine is being ridden over rough roads and the like, all customary jars which are caused by the complete raising and lowering of the rear portion of the frame of the device, will be compensated for by this rear spring fork, which will permit of the frame being moved with respect to the wheel.

From the foregoing description, it will be seen that a simple and efficient means has been provided for accomplishing the objects of the invention, but while the elements herein shown and described are well adapted to serve the functions set forth, it is obvious that various changes in form, proportion and in the minor details of construction may be resorted to without departing from the spirit or sacrificing any of the principles of the invention. In this connection, it must be particularly stated that while I have shown my spring fork as applied to the rear wheel of the device, it is equally well adapted for use in connection with the front wheel thereof.

What I claim is:—

1. A spring fork for bicycles and the like, comprising a pair of tubular members, means to mount the lower ends of said tubular members on the frame of a vehicle, means to yieldingly mount a wheel hub between said tubular members, and means for the vertical and lateral adjustment of said tubular members.

2. A spring fork for bicycles and the like, comprising a pair of tubular members, means engaging the upper ends of said tubular members to retain the same in spaced horizontal alinement, said latter means permitting the vertical and lateral adjustment of said tubular members, means to secure the lower ends of said tubular members to the frame of a vehicle and means in connection with the last referred to means for yieldingly supporting a wheel hub between the tubular members.

3. The combination with the frame of a bicycle or the like; of a pair of tubular members, spring members disposed therewithin, means to mount the lower ends of said tubular members on the rear of the frame, means in connection with the last referred to means and coöperating with said spring members to yieldingly support a wheel hub between said tubular members, means for the lateral and vertical adjustment of said tubular members, and bracing means between said frame and said tubular members.

4. In a device of the class described, the combination with the frame of a bicycle or the like; of a pair of tubular members, spring members disposed therewithin, plunger members entered within said tubular members from the lower ends thereof, sockets secured to the lower ends of said tubular members and receiving portions of said plungers, means to mount said sockets on the frame, and bracing means between said frame and tubular members.

5. In a device of the class described, the combination with the frame of a bicycle or the like; of a pair of tubular members, spring members disposed therewithin, plunger members entered within said tubular members from the lower ends thereof, sockets secured to the lower ends of said tubular members and receiving portions of said plungers, means to mount said sockets on the frame, means for the vertical and lateral adjustment of said tubular members, and bracing means between said frame and said tubular members.

6. In a device of the class described, the combination with the frame of a bicycle or the like; of a pair of tubular members, coil springs disposed therewithin, plunger members having portions thereof disposed within said tubular members from the lower ends to contact with said springs, sockets secured to the lower ends of said tubular members and receiving portions of said plungers, means to mount said sockets on the frame, and means to mount the axle of a wheel in said plunger members.

7. In a device of the class described, the combination with the frame of a bicycle or the like; of a pair of tubular members, coil springs disposed therewithin, plunger members having portions thereof disposed within said tubular members from the lower ends to contact with said springs, sockets secured to the lower ends of said tubular members and receiving portions of said plungers, means to mount said sockets on the frame, means to mount the axle of a wheel in said plunger members, means for the vertical and lateral adjustment of said tubular members, and bracing means between said frame and tubular members.

8. In a device of the class described, the combination with the frame of a bicycle or the like; of a pair of tubular members having slots therein, coil springs disposed within said tubular members, plunger members having portions thereof disposed within the lower ends of said tubular members to contact with the springs therein, sockets secured to the lower ends of said tubular members and receiving portions of said plunger members, said sockets also having slots therein and the slots in one of said tubular members and the adjacent socket being disposed in vertical alinement, while the slots in the other socket and tubular member are arranged in parallel vertical planes, an axle extending through the slots of said sockets and mounted in said plunger members, means to mount said sockets on said frame, and bracing means between said frame and tubular members.

9. In a device of the class described, the combination with the frame of a bicycle or the like; of a pair of tubular members having slots therein, coil springs disposed within said tubular members, plunger members having portions thereof disposed within the lower ends of said tubular members to contact with the springs therein, sockets secured to the lower ends of said tubular members and receiving portions of said plunger members, said sockets also having slots therein and the slots in one of said tubular members and the adjacent socket being disposed in vertical alinement, while the slots in the other socket and tubular member are arranged in parallel vertical planes, an axle extending through the slots of said sockets and mounted in said plunger members, means to mount said sockets on said frame, means for the vertical and lateral adjustment of said tubular members, and bracing means between said tubular members and the frame.

10. In a device of the class described, the combination with the frame of a bicycle or the like; of a pair of tubular members having slots therein, coil spring members disposed therewithin, plunger members of substantially inverted L-shape, the horizontal portions of which are disposed in the lower ends of said tubular members to contact with said coil springs, sockets secured to the lower ends of said tubular members and receiving the vertical portions of said plunger members, said sockets being also provided with slots therein, the slots in one socket and the adjacent tubular member being disposed in vertical alinement, while the slots in the opposite socket and tubular member are arranged in parallel vertical planes, an axle extending through the slots of said sockets and mounted in the vertical portions of said plunger members, means to mount said sockets on the frame, means for the vertical and lateral adjustment of said tubular members, and bracing means between said frame and tubular members.

In testimony whereof I hereunto affix my signature in the presence of two witnesses.

OLOF A. ECKRE.

Witnesses:
   ADOLPH DOKKEN,
   ALBERT ANDERSON.

---

Copies of this patent may be obtained for five cents each, by addressing the "Commissioner of Patents, Washington, D. C."